US009017862B2

(12) United States Patent
Horie et al.

(10) Patent No.: US 9,017,862 B2
(45) Date of Patent: Apr. 28, 2015

(54) SURFACE-TREATED STEEL SHEET FOR BATTERY CASES, METHOD OF PRODUCING SAME, BATTERY CASE, AND BATTERY

(75) Inventors: Shinichirou Horie, Yamaguchi (JP); Tatsuo Tomomori, Yamaguchi (JP); Koh Yoshioka, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 14/131,306

(22) PCT Filed: Jul. 4, 2012

(86) PCT No.: PCT/JP2012/067094
§ 371 (c)(1), (2), (4) Date: Jan. 7, 2014

(87) PCT Pub. No.: WO2013/005774
PCT Pub. Date: Jan. 10, 2013

(65) Prior Publication Data

US 2014/0147734 A1 May 29, 2014

(30) Foreign Application Priority Data

Jul. 7, 2011 (JP) ................................ 2011-150936

(51) Int. Cl.

| | |
|---|---|
| ***H01M 2/04*** | (2006.01) |
| ***H01M 2/02*** | (2006.01) |
| ***B32B 15/01*** | (2006.01) |
| ***C25D 3/56*** | (2006.01) |
| ***C22C 19/00*** | (2006.01) |

(Continued)

(52) U.S. Cl.
CPC .......... *H01M 2/0292* (2013.01); *B32B 15/013* (2013.01); *B32B 15/015* (2013.01); *C25D 3/562* (2013.01); *C22C 19/00* (2013.01); *C22C 19/03* (2013.01); *C22C 38/001* (2013.01); *C22C 38/02* (2013.01); *C22C 38/04* (2013.01); *C22C 38/06* (2013.01); *C25D 5/028* (2013.01); *C25D 5/14* (2013.01); *C25D 5/50* (2013.01); *H01M 2/0287* (2013.01); *H01M 2/026* (2013.01)

(58) Field of Classification Search
CPC .. H01M 2/0292; H01M 2/0287; H01M 2/026
USPC ........................................................ 429/176
See application file for complete search history.

(56) References Cited

FOREIGN PATENT DOCUMENTS

| | | |
|---|---|---|
| JP | 09-306439 A | 11/1997 |
| JP | 10-172521 A | 6/1998 |

(Continued)

*Primary Examiner* — Helen O Conley
(74) *Attorney, Agent, or Firm* — Muncy, Geissler, Olds & Lowe, P.C.

(57) ABSTRACT

A surface-treated steel sheet for battery cases is provided which comprises a nickel-cobalt alloy layer formed at the outermost surface of a plane to be an inner surface of a battery case. When X-ray diffraction measurement using CuKα as a radiation source is performed for the nickel-cobalt alloy layer, an intensity ratio $I_A/I_B$=0.01 to 0.9. The intensity ratio $I_A/I_B$ is a ratio of an intensity $I_A$ of a peak present at a diffraction angle 2θ within a range of 41° or more and less than 43° to an intensity $I_B$ of a peak present at a diffraction angle 2θ within a range of 43° or more and 45° or less.

6 Claims, 1 Drawing Sheet

(51) Int. Cl.

| | |
|---|---|
| ***C22C 19/03*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C25D 5/02*** | (2006.01) |
| ***C25D 5/50*** | (2006.01) |
| *C25D 5/14* | (2006.01) |

(56) References Cited

FOREIGN PATENT DOCUMENTS

| | | | |
|---|---|---|---|
| JP | 10-172522 | A | 6/1998 |
| JP | 2003-17010 | A | 1/2003 |
| JP | 2007-122940 | A | 5/2007 |
| JP | 2007-302934 | A | 11/2007 |

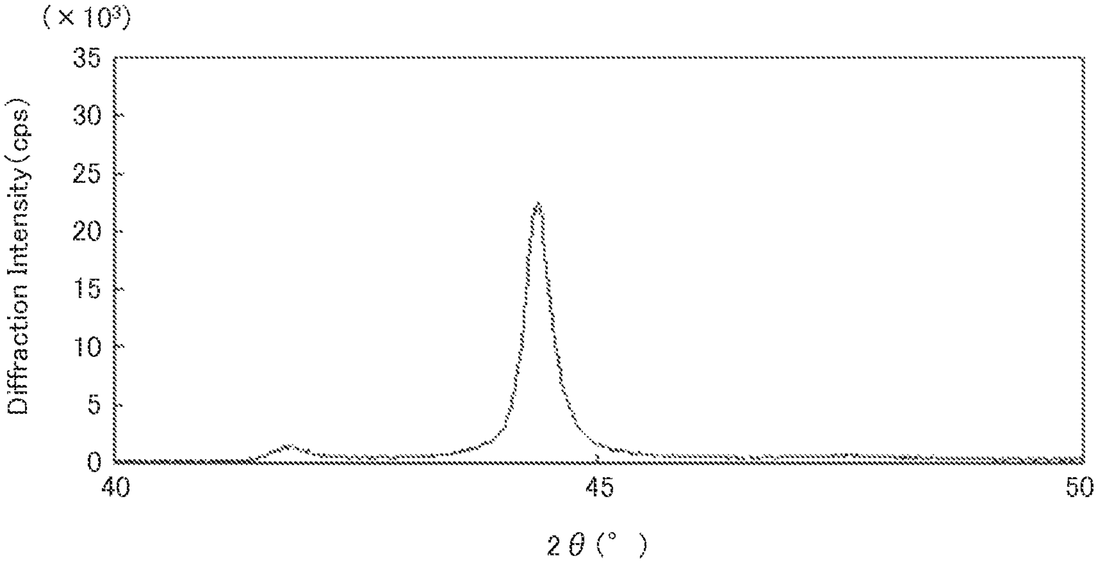
(×10³)
35
30
25
20
15
10
5
0
Diffraction Intensity (cps)
40
45
50
2θ (° )

SURFACE-TREATED STEEL SHEET FOR BATTERY CASES, METHOD OF PRODUCING SAME, BATTERY CASE, AND BATTERY

TECHNICAL FIELD

The present invention relates to a surface-treated steel sheet for battery cases, a battery case using the surface-treated steel sheet for battery cases, and a battery using the battery case.

BACKGROUND ART

In recent years, portable gadgets such as audio devices and mobile phones are used in various fields, and as power sources therefor, primary batteries such as alkaline batteries and secondary batteries such as nickel hydride batteries and lithium-ion batteries are widely used. These batteries are required to have high performance such as high output and long life, and battery cases, in which electric generating elements such as positive electrode active materials and negative electrode active materials are accommodated, are also required to be improved in their performance as important constitutional elements of batteries.

In addition, application of a conductive film to the inner surface of a battery case is recently omitted in order to reduce volatile organic solvent, and hence, as the material for such a battery case, a material is desired which can maintain battery properties at a high level even without formation of any conductive film. For example, Patent Document 1 discloses, as such a material for battery cases, a material for battery cases which is configured such that nickel alloy plated layers are formed on both surfaces of a steel sheet, and the hardness of the plated layer to be the inner surface of a battery case is set at a higher value than that of the plated layer to be the outer surface of the battery case. According to the technique disclosed in Patent Document 1, however, the advantageous effect of enhancing the battery properties, in particular the advantageous effect of reducing the internal resistance, is not necessarily sufficient when any conductive film is not formed, and further improvement is thus desired.

PRIOR ART DOCUMENTS

Patent Documents

Patent Document 1: Published Patent Application No. JP09-306439A

SUMMARY OF THE INVENTION

Problem to be Solved by the Invention

An object of the present invention is to provide a surface-treated steel sheet for battery cases which is able to enhance the battery properties even when any conductive film is not formed. Another object of the present invention is to provide a battery case and a battery which are obtained using such a surface-treated steel sheet for battery cases.

Means for Solving the Problems

As a result of intensive studies to achieve the above objects, the present inventors have found that the above objects can be achieved by forming a nickel-cobalt alloy layer at the outermost surface of a plane to be the inner surface of a battery case and controlling the crystalline orientation of the nickel-cobalt alloy layer within a predetermined range, and have accomplished the present invention.

That is, according to the present invention, there is provided a surface-treated steel sheet for battery cases, comprising a nickel-cobalt alloy layer formed at the outermost surface of a plane to be an inner surface of a battery case, wherein when X-ray diffraction measurement using CuKα as a radiation source is performed for the nickel-cobalt alloy layer, an intensity ratio $I_A/I_B$ is within a range of 0.01 to 0.9, the intensity ratio $I_A/I_B$ is a ratio of an intensity $I_A$ of a peak present at a diffraction angle 2θ within a range of 41° or more and less than 43° to an intensity $I_B$ of a peak present at a diffraction angle 2θ within a range of 43° or more and 45° or less.

The surface-treated steel sheet for battery cases according to the present invention may preferably further comprise a nickel layer as an underlying layer for the nickel-cobalt alloy layer.

The surface-treated steel sheet for battery cases according to the present invention may preferably further comprise an iron-nickel diffusion layer between the nickel-cobalt alloy layer and a steel sheet.

According to the present invention, there is provided a battery case configured by shape-forming the above any surface-treated steel sheet for battery cases.

According to the present invention, there is provided a battery configured using the above battery case.

According to the present invention, there is provided a method of producing a surface-treated steel sheet for battery cases, the surface-treated steel sheet comprising a nickel-cobalt alloy layer formed at the outermost surface of a plane to be an inner surface of a battery case, wherein the nickel-cobalt alloy layer is formed by alloy plating using a nickel-cobalt alloy plating bath which is prepared such that a molar ratio of cobalt/nickel is 0.01 to 2.4 under a condition of a bath temperature of 60° C. to 80° C. and a current density of 15 to 40 A/dm$^2$.

Effects of the Invention

According to the present invention, by forming a nickel-cobalt alloy layer at the outermost surface of a plane to be the inner surface of a battery case and controlling the crystalline orientation of the nickel-cobalt alloy layer within a predetermined range, there can be provided a surface-treated steel sheet for battery cases which is able to enhance the battery properties even when any conductive film is not formed, and also provided a battery case and a battery which are obtained using the surface-treated steel sheet for battery cases.

BRIEF DESCRIPTION OF DRAWINGS

FIG. 1 is a chart illustrating a result of X-ray diffraction measurement, using CuKα as a radiation source, for a nickel-cobalt alloy layer according to an Example of the present invention.

EMBODIMENTS FOR CARRYING OUT THE INVENTION

The surface-treated steel sheet for battery cases according to the present invention will hereinafter be described.

The surface-treated steel sheet for battery cases according to the present invention comprises a nickel-cobalt alloy layer formed at the outermost surface of a plane to be an inner surface of a battery case, and has a feature that when X-ray diffraction measurement using CuKα as a radiation source is performed for the nickel-cobalt alloy layer, an intensity ratio $I_A/I_B$ is within a range of 0.01 to 0.9, wherein the intensity ratio $I_A/I_B$ is a ratio of an intensity $I_A$ of a peak present at a diffraction angle 2θ within a range of 41° or more and less than 43° to an intensity $I_B$ of a peak present at a diffraction angle 2θ within a range of 43° or more and 45° or less.

<Steel Sheet>

A steel sheet to be a base sheet of the surface-treated steel sheet for battery cases according to the present invention is not particularly limited so long as it has excellent drawing workability, drawing and ironing workability, or workability in drawing and thin redrawing (DTR). For example, steel sheets may be used, such as formed of low-carbon aluminum-killed steel (carbon amount of 0.01 to 0.15 wt %), extra-low-carbon steel of carbon amount of 0.003 wt % or less, or non-aging extra-low-carbon steel obtained by further adding Ti or Nb to extra-low-carbon steel.

In the present invention, a hot-rolled sheet of the above steel is washed using acid to remove scale (oxide film) on the surface thereafter being cold-rolled, followed by electrolytic cleaning for rolling oil, annealing, and temper rolling in this order, thereby being used as the base sheet. The annealing in this case may be, such as, but not limited to, any of continuous annealing or batch-type annealing.

<Nickel-Cobalt Alloy Layer>

The surface-treated steel sheet for battery cases according to the present invention is configured such that a nickel-cobalt alloy layer is formed at the outermost surface of a plane to be the inner surface of a battery case. The nickel-cobalt alloy layer is such that, when X-ray diffraction measurement using CuKα as a radiation source is performed, an intensity ratio $I_A/I_B$ is within a range of 0.01 to 0.9, wherein the intensity ratio $I_A/I_B$ is a ratio of an intensity $I_A$ of a peak present at a diffraction angle 2θ within a range of 41° or more and less than 43° to an intensity $I_B$ of a peak present at a diffraction angle 2θ within a range of 43° or more and 45° or less.

According to the present invention, by controlling within the above range the intensity ratio $I_A/I_B$ obtained through X-ray diffraction measurement for the nickel-cobalt alloy layer using CuKα as a radiation source, when the surface-treated steel sheet for battery cases according to the present invention is used as a battery case of which the inner surface is provided by the nickel-cobalt alloy layer, enhanced battery properties can be achieved, and in particular the increase in the internal resistance after a lapse of time can be effectively suppressed, even when any conductive film is not formed. In addition, according to the present invention, the intensity ratio $I_A/I_B$ is controlled within the above range thereby to allow the nickel-cobalt alloy layer to have a sufficient hardness.

In order that the intensity ratio $I_A/I_B$ obtained through X-ray diffraction measurement for the nickel-cobalt alloy layer using CuKα as a radiation source is less than 0.01, the plating condition may have to be such that the bath temperature exceeds 80° C. or the current density exceeds 40 A/dm$^2$, which may cause problems, such as poor appearance, as will be described later. If, on the other hand, the intensity ratio $I_A/I_B$ is unduly large, then the effect of enhancing the hardness of the nickel-cobalt alloy layer may be insufficient, so that the effect of enhancing the battery properties is unlikely to be obtained.

Note that, in the present invention, the intensity ratio $I_A/I_B$ obtained through X-ray diffraction measurement for the nickel-cobalt alloy layer using CuKα as a radiation source can be measured using a method below, for example. That is, the X-ray diffraction measurement for the nickel-cobalt alloy layer is performed under a condition of the radiation source: Cu-40 kV, 200 mA, the divergence slit: 2°, the scattering slit: 1°, and the receiving slit: 0.3 mm. Then, from obtained data of the X-ray diffraction measurement, a peak that is present at a diffraction angle 2θ within a range of 41° or more and less than 43° and a peak that is present at a diffraction angle 2θ within a range of 4.3° or more and 45° or less are obtained. Thereafter, the peak intensities $I_A$ and $I_B$ of these peaks from which backgrounds are eliminated ($I_A$ denotes the intensity of a peak that is present at a diffraction angle 2θ within a range of 41° or more and less than 43°, while $I_B$ denotes the intensity of a peak that is present at a diffraction angle 2θ within a range of 43° or more and 45° or less) are obtained, and the ratio of the peak intensities $I_A$ and $I_B$ is calculated and the intensity ratio can thus be obtained. Note that the peak position of the peak that is present at the diffraction angle 2θ within a range of 41° or more and less than 43° may vary depending on the alloy composition of the nickel-cobalt alloy layer, and may be, but not limited to, a position of about 2θ=42°. Like the above, the peak position of the peak that is present at the diffraction angle 2θ within a range of 43° or more and 45° or less may also vary depending on the alloy composition of the nickel-cobalt alloy layer, and may be, but not limited to, a position of about 2θ=44°.

As a method of forming the nickel-cobalt alloy layer in the present invention, there may be mentioned, but not limited to, a method of forming a nickel-cobalt alloy plated layer on the surface of a steel sheet using a nickel-cobalt alloy plating bath prepared such that the cobalt/nickel ratio falls within a predetermined range.

It is preferred that the nickel-cobalt alloy plating bath to be used when forming the nickel-cobalt alloy layer is a plating bath based on a Watts bath prepared to contain nickel sulfate, nickel chloride, cobalt sulfate, and boric acid. Note that the cobalt/nickel ratio in the plating bath is preferably within a range of 0.01 to 2.4 in terms of the molar ratio of cobalt/nickel, and more preferably within a range of 0.1 to 0.7. For example, when a plating bath based on a Watts bath is used with contents of nickel sulfate, nickel chloride, cobalt sulfate and boric acid, a plating bath can be used in which components are appropriately adjusted within respective ranges of nickel sulfate: 10 to 300 g/L, nickel chloride: 20 to 60 g/L, cobalt sulfate: 10 to 250 g/L, and boric acid: 10 to 40 g/L so that the cobalt/nickel ratio falls within the above range.

In addition, it is preferred that the bath temperature of the plating bath and the current density when performing the nickel-cobalt alloy plating are set under the condition below:

the bath temperature: preferably 60° C. to 80° C. and more preferably 65° C. to 75° C.; and the current density: preferably 15 to 40 A/dm$^2$, more preferably 15 to 30 A/dm$^2$, and furthermore preferably 20 to 30 A/dm$^2$.

According to the present invention, the bath temperature of the plating bath and the current density when performing the nickel-cobalt alloy plating are controlled within the above ranges, and thereby the intensity ratio $I_A/I_B$ obtained through X-ray diffraction measurement for the nickel-cobalt alloy layer using CuKα as a radiation source can be within the above certain range.

If the bath temperature is lower than 60° C., then a sufficient amount of cobalt may not be incorporated in the plated film in terms of the plating bath composition and a nickel-cobalt alloy layer having a desired composition cannot be obtained, so that the conductivity of the obtained nickel-cobalt alloy layer will deteriorate. If, on the other hand, the bath temperature exceeds 80° C., then evaporation from the plating bath may be remarkable so that the concentration of the plating bath will change, and it will be difficult to control plating.

If the current density is less than 15 A/dm$^2$, then the obtained nickel-cobalt alloy layer may have a low hardness. If, on the other hand, the current density exceeds 40 A/dm$^2$, then the obtained nickel-cobalt alloy layer may have a poor appearance and contain cobalt inhomogeneously, so that the conductivity of the obtained nickel-cobalt alloy layer will deteriorate. Note that the current density may further preferably be 30 A/dm$^2$ or less because the control with regard to managing the bath temperature will be somewhat difficult if the current density is more than 30 A/dm$^2$ and less than 40 A/dm$^2$.

While the bath temperature of the plating bath and the current density when performing the nickel-cobalt alloy plating may be set within the above ranges, it is preferred that the current density is set at a relatively high value within the range of 15 to 40 A/dm$^2$ if the bath temperature of the plating bath is 60° C. or higher and lower than 65° C. As another plating condition, pH of the plating bath may preferably be within a range of 1.5 to 5.0, and more preferably within a range of 3.0 to 5.0.

In the present invention, before forming the nickel-cobalt alloy layer, underlying nickel plating may be performed to form an underlying nickel plated layer. The underlying nickel plated layer may be formed using a commonly used Watts bath, and the thickness thereof is preferably within a range of 0.05 to 3.0 μm, and more preferably within a range of 0.1 to 2.0 μm. Forming the underlying nickel plated layer allows the surface-treated steel sheet for battery cases of the present invention to have the nickel layer and the nickel-cobalt alloy layer in this order from below on the steel sheet (Ni—Co/Ni/Fe).

When the underlying nickel layer is not formed in the surface-treated steel sheet for battery cases according to the present invention, the thickness of the nickel-cobalt alloy layer may preferably be within a range of 0.01 to 2.0 μm, and more preferably within a range of 0.05 to 1.0 μm. When the underlying nickel layer is formed, the thickness of the nickel-cobalt alloy layer may preferably be within a range of 0.01 to 1.0 μm, and more preferably within a range of 0.05 to 0.4 μm. The thickness of the nickel-cobalt alloy layer being unduly thin may raise a concern that sufficient battery properties cannot be obtained, while the thickness being unduly thick may raise concerns of high cost and insufficient volume at the time of forming a battery case.

When the underlying nickel plated layer is formed, the surface-treated steel sheet for battery cases according to the present invention may be one obtained such that, after the formation of the underlying nickel plated layer, but before the nickel-cobalt alloy plating, some treatment for thermal diffusion is performed by heat treatment. Heat treatment in this case may be performed by any of continuous annealing method or batch-type annealing method, and the heat treatment condition may be appropriately selected depending on the thickness of the underlying nickel plated layer. If, for example, the continuous annealing is employed, then it is preferred that the heat treatment temperature is within a range of 600° C. to 900° C. and the heat treatment time is within a range of 3 to 120 seconds, while if the batch-type annealing is employed, then it is preferred that the heat treatment temperature is within a range of 400° C. to 700° C., the heat treatment time is within a range of 30 minutes to 12 hours, and the heat treatment atmosphere is non-oxidizing atmosphere or reducing protective gas atmosphere. Note that, if the heat treatment atmosphere is the reducing protective gas atmosphere, then it is preferred to use protective gas which comprises 75% hydrogen-25% nitrogen with high heat conductivity and which is generated by ammonia crack method, referred to as hydrogen enriched annealing.

The above treatment for thermal diffusion may be performed thereby to diffuse the steel sheet and the underlying nickel plated layer to each other, so that an iron-nickel diffusion layer can be formed on the steel sheet. In this case, the underlying nickel plated layer may be configured to completely diffuse into iron, or configured such that a part of the underlying nickel plated layer does not diffuse into iron and remains as a nickel layer. When the underlying nickel plated layer is diffused completely into iron, the surface-treated steel sheet for battery cases according to the present invention can be configured to have the iron-nickel diffusion layer and the nickel-cobalt alloy layer in this order from below on the steel sheet (Ni—Co/Fe—Ni/Fe). Alternatively, when the nickel layer remains, the surface-treated steel sheet for battery cases according to the present invention can be configured to have the iron-nickel diffusion layer, the nickel layer, and the nickel-cobalt alloy layer in this order from below on the steel sheet (Ni—Co/Ni/Fe—Ni/Fe).

<Battery Case>

The battery case according to the present invention can be obtained using the above surface-treated steel sheet for battery cases according to the present invention. More specifically, the battery case according to the present invention is configured by forming the above surface-treated steel sheet for battery cases according to the present invention via drawing, ironing, DI or DTR forming so that the nickel-cobalt alloy layer is located at the inner surface side of the case.

The battery case according to the present invention is formed using the above surface-treated steel sheet for battery cases according to the present invention, and hence, even when any conductive film is not formed on the surface to be the inner surface of a battery case, enhanced battery properties such as low internal resistance can be achieved. Therefore, the battery case according to the present invention can preferably be used as a battery case for batteries, such as alkaline batteries and nickel hydride batteries, which employ alkaline electrolytic solution, and for other batteries, such as lithium-ion batteries.

EXAMPLES

The present invention will hereinafter be more specifically described with reference to examples, but the present invention is not limited to these examples.

Example 1

As a base sheet, a steel sheet which was obtained by annealing a cold-rolled sheet (thickness of 0.25 mm) of low-carbon aluminum-killed steel having a chemical composition as below was prepared.

C: 0.045 wt %, Mn: 0.23 wt %, Si: 0.02 wt %, P: 0.012 wt %, S: 0.009 wt %, Al: 0.063 wt %, N: 0.0036 wt %, and the remainder: Fe and inevitable impurities.

The prepared steel sheet was then subjected to alkaline electrolytic degreasing and acid pickling of sulfuric acid immersion, followed by nickel-cobalt alloy plating under the condition below to form a nickel-cobalt alloy layer of thickness of 2 μm, and a surface-treated steel sheet was thus obtained. Note that the condition for the nickel-cobalt alloy plating was as follows.

bath composition: containing nickel sulfate, nickel chloride, cobalt sulfate, cobalt chloride, and boric acid with a molar ratio of cobalt/nickel of 0.22 pH: 3.5 to 5.0 bath temperature: 60° C.

current density: 15 A/dm$^2$

For the nickel-cobalt alloy layer of the surface-treated steel sheet obtained in such a manner, the methods below were employed to measure the intensity ratio $I_A/I_B$ ($I_A$ denotes the intensity of a peak that is present at a diffraction angle 2θ within a range of 41° or more and less than 43°, while $I_B$ denotes the intensity of a peak that is present at a diffraction angle 2θ within a range of 43° or more and 45° or less) and the surface hardness.

<Intensity Ratio $I_A/I_B$ of Nickel-Cobalt Alloy Layer>

For the nickel-cobalt alloy layer of the surface-treated steel sheet, X-ray diffraction measurement was performed using an X-ray diffractometer (RINT2500/PC available from Rigaku Corporation) under a condition of the radiation source: CuKα-40 kV, 200 mA, the divergence slit: 2°, the scattering slit: 1°, the receiving slit: 0.3 mm, and the measurement range: $35° \leq 2θ \leq 50°$. Using the diffraction pattern obtained as a result of the X-ray diffraction measurement, arithmetic operations were executed for the intensity $I_A$ of a peak that was present at a diffraction angle 2θ within a range of 41° or more and less than 43° and the peak $I_B$ of a peak that was present at a diffraction angle 2θ within a range of 43° or more and 45° or less, and their ratio $I_A/I_B$ was calculated. Results are listed in Table 1.

<Surface Hardness of Nickel-Cobalt Alloy Layer>

The surface hardness (Hv10g) of the nickel-cobalt alloy layer was measured using a micro-Vickers hardness tester under a condition of a load of 10 g. Results are listed in Table 1.

Examples 2 and 3

Surface-treated steel sheets were obtained like in Example 1 except for changing, when forming the nickel-cobalt alloy layer, the current density for the nickel-cobalt alloy plating to 20 A/dm$^2$ (Example 2) and 30 A/dm$^2$ (Example 3), and evaluations were conducted in the same manner. Results are listed in Table 1.

Examples 4 to 6

Surface-treated steel sheets were obtained like in Example 1 except for changing, when forming the nickel-cobalt alloy layer, the bath temperature of the nickel-cobalt alloy plating bath to 70° C. and the current density for the nickel-cobalt alloy plating to 15 A/cm$^2$ (Example 4), 20 A/dm$^2$ (Example 5) and 30 A/dm$^2$ (Example 6), and evaluations were conducted in the same manner. Results are listed in Table 1.

Examples 7 to 9

Surface-treated steel sheets were obtained like in Example 1 except for changing, when forming the nickel-cobalt alloy layer, the bath temperature of the nickel-cobalt alloy plating bath to 80° C. and the current density for the nickel-cobalt alloy plating to 15 A/dm$^2$ (Example 7), 20 A/dm$^2$ (Example 8) and 30 A/dm$^2$ (Example 9), and evaluations were conducted in the same manner. Results are listed in Table 1.

Comparative Examples 1 and 2

Surface-treated steel sheets were obtained like in Example 1 except for changing, when forming the nickel-cobalt alloy layer, the current density for the nickel-cobalt alloy plating to 5 A/dm$^2$ (Comparative Example 1) and 10 A/dm$^2$ (Comparative Example 2), and evaluations were conducted in the same manner. Results are listed in Table 1.

Comparative Examples 3 and 4

Surface-treated steel sheets were obtained like in Example 1 except for changing, when forming the nickel-cobalt alloy layer, the bath temperature of the nickel-cobalt alloy plating bath to 70° C. and the current density for the nickel-cobalt alloy plating to 5 A/dm$^2$ (Comparative Example 3) and 10 A/dm$^2$ (Comparative Example 4), and evaluations were conducted in the same manner. Results are listed in Table 1.

Comparative Examples 5 and 6

Surface-treated steel sheets were obtained like in Example 1 except or changing, when forming the nickel-cobalt alloy layer, the bath temperature of the nickel-cobalt alloy plating bath to 80° C. and the current density for the nickel-cobalt alloy plating to 5 A/dm$^2$ (Comparative Example 5) and 10 A/dm$^2$ (Comparative Example 6), and evaluations were conducted in the same manner. Results are listed in Table 1.

TABLE 1

| | | Plating condition for Ni—Co alloy layer | | | Surface |
|---|---|---|---|---|---|
| | Configuration of plated layer | Bath temperature (° C.) | Current density (A/dm$^2$) | Intensity ratio $I_A/I_B$ of Ni—Co alloy layer | hardness of Ni—Co alloy layer (Hv10g) |
| Example 1 | Ni—Co layer: 2 μm | 60 | 15 | 0.11 | 245 |
| Example 2 | Ni—Co layer: 2 μm | 60 | 20 | 0.06 | 246 |
| Example 3 | Ni—Co layer: 2 μm | 60 | 30 | 0.017 | 262 |
| Example 4 | Ni—Co layer: 2 μm | 70 | 15 | 0.17 | 245 |
| Example 5 | Ni—Co layer: 2 μm | 70 | 20 | 0.053 | 253 |
| Example 6 | Ni—Co layer: 2 μm | 70 | 30 | 0.033 | 259 |
| Example 7 | Ni—Co layer: 2 μm | 80 | 15 | 0.216 | 254 |
| Example 8 | Ni—Co layer: 2 μm | 80 | 20 | 0.1 | 269 |
| Example 9 | Ni—Co layer: 2 μm | 80 | 30 | 0.032 | 274 |
| Comparative Example 1 | Ni—Co layer: 2 μm | 60 | 5 | 16 | 233 |
| Comparative Example 2 | Ni—Co layer: 2 μm | 60 | 10 | 2 | 244 |
| Comparative Example 3 | Ni—Co layer: 2 μm | 70 | 5 | 21 | 240 |

TABLE 1-continued

| | Configuration of plated layer | Plating condition for Ni—Co alloy layer: Bath temperature (° C.) | Current density (A/dm²) | Intensity ratio $I_A/I_B$ of Ni—Co alloy layer | Surface hardness of Ni—Co alloy layer (Hv10g) |
|---|---|---|---|---|---|
| Comparative Example 4 | Ni—Co layer: 2 μm | 70 | 10 | 5.9 | 235 |
| Comparative Example 5 | Ni—Co layer: 2 μm | 80 | 5 | 4.9 | 223 |
| Comparative Example 6 | Ni—Co layer: 2 μm | 80 | 10 | 4 | 242 |

As shown in Table 1, any of Examples 1 to 9, in which the bath temperature of the plating bath is 60° C. to 80° C. and the current density is 15 to 30 A/dm$^2$ when the nickel-cobalt alloy plating is performed, is such that the intensity ratio $I_A/I_B$ obtained through the X-ray diffraction measurement for the nickel-cobalt alloy layer is within a range of 0.01 to 0.9. In such a manner, by setting the intensity ratio $I_A/I_B$ within a range of 0.01 to 0.9, when the surface-treated steel sheet for battery cases is used as a battery case of which the inner surface is provided by the nickel-cobalt alloy layer, enhanced battery properties can be achieved, and in particular the increase in the internal, resistance after a lapse of time can be effectively suppressed, even when any conductive film is not formed. Moreover, in any of Examples 1 to 9, the surface hardness of the nickel-cobalt alloy layer was high. Note that FIG. 1 presents an X-ray diffraction pattern obtained as a result of the X-ray diffraction measurement for the nickel-cobalt alloy layer in Example 2.

In contrast, any of Comparative Examples 1 to 6, in which the current density was less than 15 A/dm$^2$ when the nickel-cobalt alloy plating was performed, was such that the intensity ratio $I_A/I_B$ obtained through the X-ray diffraction measurement for the nickel-cobalt alloy layer was a value larger than 0.9. Therefore, when the surface-treated steel sheet for battery cases was used as a battery case with its inner surface provided by the nickel-cobalt alloy layer, there would not be expected the effect of enhancing the battery properties, in particular the effect of suppressing the increase in the internal resistance after a lapse of time.

Example 10

The same steel sheet as that in Example 1 was prepared as a base sheet, and the prepared steel sheet was subjected to alkaline electrolytic degreasing and acid pickling of sulfuric acid immersion, followed by nickel plating under the condition below to form a nickel plated layer of thickness of 1.0 μm, and a surface-treated steel sheet was then obtained by performing nickel-cobalt alloy plating under the condition below to form a nickel-cobalt alloy layer of thickness of 0.2 μm on the nickel plated layer.

<Nickel Plating>

Bath composition: nickel sulfate of 250 g/L, nickel chloride of 45 g/L, and boric acid of 30 g/L pH: 3.5 to 5.0

Bath temperature: 60° C.

Current density: 10 A/dm$^2$

<Nickel-Cobalt Alloy Plating>

Bath composition: containing nickel sulfate, nickel chloride, cobalt sulfate, cobalt chloride, and boric acid with a molar ratio of cobalt/nickel of 0.22 pH: 3.5 to 5.0

Bath temperature: 60° C.

Current density: 20 A/dm$^2$

The surface-treated steel sheet obtained in such a manner was drawn to form a cylindrical LR6-type battery (AA-type battery) case having an outer diameter of 13.8 mm and a height of 49.3 mm so that the nickel-cobalt alloy layer would be located at the inner surface side of the battery case, and the battery case was thus produced.

The obtained battery case was then used to produce an alkaline manganese battery as below. That is, a positive electrode mixture was first produced by sampling manganese dioxide and graphite with a ratio of 10:1, adding potassium hydroxide (10 mol) to the manganese dioxide and graphite, and mixing them. Next, this positive electrode mixture was then pressurized in a mold to form a doughnut-shaped positive electrode mixture pellet having a predetermined size, and the mixture pellet was pressed and inserted into the battery case obtained as the above. Subsequently, a negative electrode plate to which a negative electrode current collector rod was fixed by spot welding was attached to the battery case. Next, a separator formed of vinylon fabric cloth was then inserted into the positive electrode mixture pellet, which was pressed and inserted in the battery case, so as to be located along the inner periphery of the positive electrode mixture pellet, and the battery case was filled with a negative electrode gel comprising potassium hydroxide saturated with zinc particles and zinc oxide. After attaching an insulator gasket to the negative electrode plate and inserting them into the battery case, swaging was performed to complete the alkaline manganese battery. In Example 10, a conductive film containing graphite powder as the main component was not formed on the inner surface of the battery case.

Then, using the surface-treated steel sheet obtained as the above, the surface hardness of the nickel-cobalt alloy layer was measured like in Example 1. Results are listed in Table 2. In addition, measurement of the surface roughness of the battery case inner surface was performed using the battery case obtained as the above, and measurement of the internal resistance IR was performed using the alkaline manganese battery obtained as the above, in accordance with the methods below.

<Surface Roughness Ra after Forming Battery Case>

The surface roughness Ra of the nickel-cobalt alloy layer at the inner surface side of the battery case produced as the above was measured using an ultra-depth geometry measurement microscope (VK-8550 available from KEYENCE). Results are listed in Table 2.

<Internal Resistance IR>

For the alkaline manganese battery obtained as the above, the internal resistance (mΩ) was measured using the alternating current impedance method. The initial internal resistance was measured after leaving and stabilizing the battery untouched for one day or more under ordinary temperature, and the internal resistance after a lapse of time was measured after leaving the battery untouched for 20 days under a temperature of 60° C. The lower the internal resistance is, the higher the battery properties can be determined to have. Results are listed in Table 2.

Examples 11 and 12

Surface-treated steel sheets, battery cases and alkaline manganese batteries were produced like in Example 10 except for changing, when forming the nickel-cobalt alloy layer, the bath temperature of the nickel-cobalt alloy plating bath to 70° C. (Example 11) and 80° C. (Example 12), and evaluations were conducted like in Example 10. Results are listed in Table 2.

Comparative Example 7

A surface-treated steel sheet and a battery case were produced like in Example 10 except for omitting the formation of the nickel-cobalt alloy layer when obtaining the surface-treated steel sheet, and evaluations were conducted like in Example 10. In Comparative Example 7, an alkaline manganese battery was produced like in Example 10 except for additionally forming a conductive film containing graphite powder as the main component on the inner surface of the battery case, and evaluations were conducted like in Example 10. Results are listed in Table 2.

Comparative Example 8

A surface-treated steel sheet was obtained like in Example 1 except for changing, when forming the nickel-cobalt alloy layer, the bath temperature of the nickel-cobalt alloy plating bath to 60° C. and the current density for the nickel-cobalt alloy plating to 5 A/dm$^2$, and evaluations were conducted in the same manner. Results are listed in Table 2.

was formed, even when any conductive film containing graphite powder as the main component was not formed on the inner surface of the battery case. In particular, it was confirmed that the increase in the internal resistance after a lapse of time was able to be effectively suppressed.

In contrast, Comparative Example 8, in which the current density was less than 15 A/dm$^2$ when the nickel-cobalt alloy plating was performed, had a result that the surface hardness of the surface-treated steel sheet was low compared with Examples 10 to 12, in which the bath temperature of the plating bath was 60° C. to 80° C. and the current density was 15 to 40 A/dm$^2$ when the nickel-cobalt alloy plating was performed, and accordingly had a result that the surface roughness Ra of the battery case's inner surface after the formation of the battery case was low. Moreover, in Comparative Example 8, the effect of enhancing the battery properties (internal resistance IR) was insufficient compared with Examples 10 to 12.

Measurement of the intensity ratio $I_A/I_B$ through the X-ray diffraction measurement was not performed for Examples 10 to 12 because the thickness of the nickel-cobalt alloy layer was thin, but it can be determined from the above results of Examples 1 to 9 that any of Examples 10 to 12 has the intensity ratio $I_A/I_B$ through the X-ray diffraction measurement within a range of 0.01 to 0.9. Also for Comparative Example 8, measurement of the intensity ratio $I_A/I_B$ through the X-ray diffraction measurement was not performed because the thickness of the nickel-cobalt alloy layer was thin, but it can be determined from the above result of Comparative Example 1 that the intensity ratio $I_A/I_B$ through the X-ray diffraction measurement exceeds 0.9.

The invention claimed is:

1. A surface-treated steel sheet for battery cases, comprising a nickel-cobalt alloy layer formed at the outermost surface

TABLE 2

| | Comfiguration of plated layer | Plating condition for Ni—Co alloy layer: Bath temperature (° C.) | Plating condition for Ni—Co alloy layer: Current density (A/dm$^2$) | Surface hardness of Ni—Co alloy layer*1) (Hv10 g) | Sueface roughness after forming battery case Ra (μm) | Battery properties: Presence or absence of conductive film | Battery properties: Initial internal resistance IR (mΩ) | Battery properties: Internal resistance IR after a lapse of time (mΩ) |
|---|---|---|---|---|---|---|---|---|
| Example 10 | Ni layer: 1 μm<br>Ni—Co layer: 0.2 μm | 60 | 20 | 188 | 0.86 | Absent | 164 | 171 |
| Example 11 | Ni layer: 1 μm<br>Ni—Co layer: 0.2 μm | 70 | 20 | 207 | 1.45 | Absent | 155 | 158 |
| Example 12 | Ni layer: 1 μm<br>Ni—Co layer: 0.2 μm | 80 | 20 | 221 | 1.5 | Absent | 156 | 164 |
| Comparative Example 7 | Ni layer: 1 μm | — | — | 130 | 0.59 | Present | 155 | 182 |
| Comparative Example 8 | Ni layer: 1 μm<br>Ni—Co layer: 0.2 μm | 60 | 5 | 183 | 0.82 | Absent | 165 | 179 |

*1) Surface hardness of Ni plated layer for Comparative Example 7

As shown in Table 2, any of Examples 10 to 12, in which the bath temperature of the plating bath was 60° C. to 80° C. and the current density was 15 to 40 A/dm$^2$ when the nickel-cobalt alloy plating was performed, had a result that the surface hardness of the surface-treated steel sheet was high compared with Comparative Example 7 in which the nickel-cobalt alloy layer was not formed, and accordingly had a result that the surface roughness Ra of the battery case's inner surface after the formation of the battery case was high. It was also confirmed that Examples 10 to 12 were able to achieve more enhanced battery properties (inner resistance IR) than that in Comparative Example 7 in which a conductive film of a plane to be an inner surface of a battery case, wherein when X-ray diffraction measurement using CuKα as a radiation source is performed for the nickel-cobalt alloy layer, an intensity ratio $I_A/I_B$ is within a range of 0.01 to 0.9, the intensity ratio $I_A/I_B$ is a ratio of an intensity $I_A$ of a peak present at a diffraction angle 2θ within a range of 41° or more and less than 43° to an intensity $I_B$ of a peak present at a diffraction angle 2θ within a range of 43° or more and 45° or less.

2. The surface-treated steel sheet for battery cases as set forth in claim 1, further comprising a nickel layer as an underlying layer for the nickel-cobalt alloy layer.

3. The surface-treated steel sheet for battery cases as set forth in claim 1, further comprising an iron-nickel diffusion layer between the nickel-cobalt alloy layer and a steel sheet.

4. A battery case configured by shape-forming the surface-treated steel sheet for battery cases as set forth in claim 1.

5. A battery configured using the battery case as set forth claim 4.

6. A method of producing a surface-treated steel sheet for battery cases, the surface-treated steel sheet comprising a nickel-cobalt alloy layer formed at the outermost surface of a plane to be an inner surface of a battery case, wherein the nickel-cobalt alloy layer is formed by alloy plating using a nickel-cobalt alloy plating bath which is prepared such that a molar ratio of cobalt/nickel is 0.01 to 2.4 under a condition of a bath temperature of 60° C. to 80° C. and a current density of 15 to 40 $A/dm^2$.

* * * * *